United States Patent [19]
Meacham

[11] Patent Number: 5,923,716
[45] Date of Patent: Jul. 13, 1999

[54] PLASMA EXTRUSION DYNAMO AND METHODS RELATED THERETO

[76] Inventor: G. B. Kirby Meacham, 18560 Parkland Dr., Shaker Heights, Ohio 44122

[21] Appl. No.: 08/740,333

[22] Filed: Nov. 7, 1996

[51] Int. Cl.[6] .................................................. G21B 1/00
[52] U.S. Cl. ........................................ 376/121; 376/146
[58] Field of Search .................................. 376/100, 121, 376/133, 128, 144, 146, 107, 139, 140, 127, 141

[56] References Cited

U.S. PATENT DOCUMENTS

| | | | |
|---|---|---|---|
| 2,868,991 | 1/1959 | Josephson et al. | 376/133 |
| 3,093,569 | 6/1963 | Post | 376/139 X |
| 3,166,477 | 1/1965 | Leboutet | 376/128 |
| 3,324,316 | 6/1967 | Cann | 276/141 |
| 3,467,885 | 9/1969 | Cann | 376/141 X |
| 3,655,508 | 4/1972 | Hirsch | 376/128 X |
| 4,436,691 | 3/1984 | Jardin et al. | 376/137 |
| 4,650,631 | 3/1987 | Knorr | 376/127 |
| 4,891,180 | 1/1990 | Koloc | 376/144 |
| 5,015,432 | 5/1991 | Koloc | 376/148 |

OTHER PUBLICATIONS

Johnson, B.W., et al., "Injection of a Streaming Plasma into a Mirror Machine", *Plasma Physics*, vol. 15, pp. 369–374, Pergamon Press, 1973.

Miyamoto, K., "Plasma Physics for Nuclear Fusion", Iwanami Shoten Publishers, Japan, 1989, Section 6.7 and Sections 16.2a–16.2i.

Ono, Y., et al., "Experimental Investigation of Three–dimensional Magnetic Reconnection by use of Two Colliding Spheromaks", *Phys. Fluids* B 5 (10), American Institute of Physics, Oct. 1993, pp. 3691–3701.

Tuszewski, M., "Field Reversed Configuration", *Nuclear Fusion*, vol. 28, No. 11, pp. 2033–2092.

Bellan, P.M., "Particle Confinement in Realistic 3D Rotamak Equilibria", *Physical Review Letters*, vol. 62, No. 21, pp. 2464–2467, May 22, 1989.

Jarboe, T.R., "Review of Spheromak Research", *Plasma Phys. Control. Fusion*, 36, pp. 945–990, 1994, (UK).

*Primary Examiner*—Daniel D. Wasil
*Attorney, Agent, or Firm*—David G. Conlin; William J. Daley, Jr.; Dike, Bronstein, Roberts & Cushman, LLP

[57] ABSTRACT

Featured is a plasma extrusion dynamo and methods related thereto. Also featured are fusion reactors using such dynamos and methods. In the methodology of the present invention, a steady-state stream of conductive plasma is forced by pressure or momentum to flow into a magnetic extrusion nozzle made up of converging magnetic field lines so as to form a closed, steady-state current loop within the plasma. The plasma current loop in turn forms a closed set of poloidal field lines which interact with the plasma current to compress and confine a portion of the plasma in a toroidal volume. Such pressure and confinement establish the conditions for magnetically confining controlled nuclear fusion reactions for power generation. A fusion reactor using the plasma extrusion dynamo methodology includes a source of high pressure or high velocity plasma, one or more converging magnetic extrusion nozzles, and a plasma exhaust area at low pressure. In a preferred embodiment, a reactor includes two magnetic extrusion dynamos back-to-back with shared field lines. Neutral material is inserted into the common space between the nozzles and ionized to form the plasma that flows through both nozzles to form two steady-state plasma current loops wherein conditions conducive to fusion are established. A magnetic coil is disposed between the dynamos to separate and stabilize the two plasma current loops.

17 Claims, 4 Drawing Sheets

PLASMA EXTRUSION DYNAMO AND METHODS RELATED THERETO

FIELD OF INVENTION

The present invention relates to reactors that confine plasma within magnetic fields at temperatures and pressures conducive to establishing nuclear fusion reactions and methods related to establishing such conditions.

BACKGROUND OF THE INVENTION

Magnetic fusion reactions, such as between deuterium and tritium combined in a hot plasma, have the potential to provide energy with minimal production of long-lived radioisotopes. It is well known that such reactions take place under very high temperatures conditions at which particle momentum is sufficient to overcome the mutual electrostatic repulsion of the reacting nuclei. Physical walls are not feasible for containing the reactions at the required temperatures, because the walls will cool the reactants, thereby quenching the reaction. As such, devices or apparatuses have been pursued that use non-physical means to containing the fusion reactions. These non-physical means of containment have used inertia, magnetism and electrostatic forces as the means for containing the reactions. Because the present invention is in the class of devices that use magnetic forces, the following will be confined to a discussion of this class of device.

Hot plasma is an electrically conductive fluid that will flow with little resistance along magnetic field lines, but diffuse slowly across field lines because it is retarded by the magnetic reaction forces resulting from currents induced in the plasma. For this reason, an objective in designing a magnetic containment system is to suspend the plasma in a field with lines which form closed paths within the plasma confinement volume, and therefore do not provide direct escape paths along field lines. Closed current loops in the conductive plasma form closed magnetic flux loops within the plasma. A simple current loop, for example, forms poloidal flux loops that enclose a toroidal volume which surrounds the current loop. Three magnetic confinement schemes using such internal magnetic currents to generate at least a portion of the confining field are tokamaks, spheromaks and theta pinch systems.

Spheromaks are formed by two interlinked plasma current loops generated by inductive and/or coaxial gun conductive means, resulting in a near-spherical toroidal confinement volume with field components in both the poloidal and toroidal directions. Tokamaks are toroidal confinement volumes formed by toroidal field components from an external set of poloidal coils and poloidal field components from a toroidal current loop induced by a time-changing external field. Theta pinch systems are toroidal confinement volumes formed by a single plasma current loop induced by a time-changing external field, with field components primarily in the poloidal direction. Reference also should be made to U.S. Pat. No. 4,436,691; Thomas R. Jarboe, "Review of Spheromak Research", *Plasma Physics and Controlled Fusion*, Vol. 36, pp. 945–990 (1994); Kenro Miyamoto, *Plasma Physics for Nuclear Fusion* (Revised Edition), pp. 530–552, The MIT Press, Cambridge, Mass. (1987); and M. Tuszewski, "Field Reversed Configurations", *Nuclear Fusion*, Vol. 28, No. 11, pp. 2033–2092 (1988).

There are a number of known processes for forming currents in the plasma as briefly discussed below. In one process, an inductive transformer action induces transient current loops in a stationary plasma, using time-changing external fields. This process is simple and does not require conductive electrodes to contact with the plasma. However, it is by nature transient, not steady-state. This principle is used in the tokamak and theta pinch approaches In another process, a conductive current transfer forms a plasma current between two electrodes, and then the plasma is moved away from the electrodes. The movement causes the current to detach from the electrodes and reconnect as a closed loop. The process may be repeated rapidly to form a sequence of current loops which merge with and sustain a preexisting current loop. See also Y. Ono, A. Morita, M. Katsurai and M. Yamada, "Experimental Investigation of Three-Dimensional Magnetic Reconnection by Use of Two Colliding Spheromaks," *Phys. Fluids B*, Vol. 5, pp 3691- to 3701 (1993). This principle is used in the coaxial gun spheromak formation approaches referenced above.

In yet another process, an inductive current transfer forms a plasma current in a plasma volume, and then the plasma is moved away from the formation area. The movement causes a process in which magnetic reconnection results in a closed current loop that is no longer inductively linked with the original formation field. As with the conductive current transfer process, this process may be repeated rapidly to form a sequence of current loops which merge with and sustain a preexisting current loop. This principle is used in the inductive and conical theta pinch spheromak formation approaches referenced above.

Particle beams or traveling waves may be used to differentially move the plasma electrons relative to the positive nuclei and create a steady-state current within the plasma. This method is discussed in the tokamak confinement scheme referenced above. It is also used in the rotamak, confinement scheme, a variation of the spheromak. See also P. M. Bellan, "Particle Confinement in Realistic 3D Rotamak Equilibria", *Physical Review Letters*, Vol. 62, No. 21 pp 2464–2467 (1989).

Radial diffusion of plasma through the poloidal field lines of a tokamak has been observed to generate a toroidal "bootstrap" current which supplements or replaces the inductively generated current (See Kenro Miyamoto, *Plasma Physics for Nuclear Fusion* (Revised Edition), pp. 225 and 552, The MIT Press, Cambridge, Mass. (1987)). This is a first order electromagnetic dynamo process, and is potentially steady-state, assuming a sustained flow of fresh plasma into the confinement volume. It has the further advantage of being driven by the temperature and pressure differences between the central fusion reaction zone and the outside of the containment volume, and therefore does not consume external electric power.

Magnetic mirror plasma confinement devices generate open solenoidal magnetic fields with stronger mirror fields at the ends to reflect plasma particles back toward the center of the containment volume. Experiments were carried out on various means of inserting plasma into these devices, including shooting high velocity pulses of plasma axially through the mirrors, e.g., see B. W. Johnson and J. G. Siambis, "Injection of a Streaming Plasma Into a Mirror Machine," *Plasma Physics*, Vol. 15, pp 369 to 374 (1973). The experimental data include the finding that the peak transient plasma density in the inlet throat of the mirror is about 6 times higher than the peak plasma density achieved at the midplane of the device. The authors interpret this high inlet density as the result of a shock wave, and treat it as a problem to be overcome in achieving efficient plasma injection into the mirror machine.

The above described systems, have not progressed to the stage where conditions conducive to fusion reactions have been continuously maintained so that energy can be reliably produced for consumption. As such, there is still need for devices, systems and methods for confining plasmas under conditions conducive to fusion reactions and more particularly a system/method where a steady-state current is formed internal to the plasma.

SUMMARY OF THE INVENTION

The present invention features a system, a plasma extrusion dynamo, and method for generating conditions conducive to fusion reactions and which confine the fusion reactions using a novel magnetic confinement scheme. In the method and system of the present invention, a magnetic field, preferably a conical magnetic field, is generated that defines an inlet region or nozzle and an outlet region. A pressure driven flow of conductive plasma is flowed towards the nozzle of the magnetic field. The flow conditions established are such that the inlet region is at a higher pressure than in the outlet region. Further, the inlet region pressure conditions are established so the conductive plasma continuously crosses the radial components of the magnetic field and generates a circularly polarized voltage and current loop around the axis of the nozzle.

More particularly, the method that establishes conditions conducive for fusion reactions includes generating a converging magnetic field, preferably a conical converging magnetic, that has a nozzle region and an exit region and generating a conductive plasma using any of a number of means known to those skilled in the art. The pressurized flow of the conductive plasma is directed towards the nozzle region so the plasma crosses radial components of the magnetic field being generated. The crossing of the field lines by the plasma establishes an annular ring of current in the plasma in the nozzle region thereby creating poloidal magnetic fields thereabout. The magnitude of the magnetic field being generated and the flow of the plasma are selected so as to create conditions within the poloidal magnetic fields conducive to fusion reactions.

The plasma current loop being established generates a set of closed poloidal magnetic flux loops that encloses a toroidal volume which contains the plasma current loop. The interaction of the plasma current loop with its own poloidal field compresses the plasma toward the toroid section axis through the pinch effect. This pinched plasma is contained far from any physical wall, thereby sustaining nuclear fusion reaction conditions.

Also featured are two fusion reactor embodiments that utilize at least one plasma extrusion dynamo of the present invention to create conditions conducive to fusion reactions and to generate sustained fusion reactions so as to produce energy for consumption. In a first embodiment, such a fusion reactor includes a plasma extrusion dynamo, an impermeable housing, a means for generating a source of high pressure conductive plasma for the fusion reaction and a means for exhausting the impermeable housing to remove or scavenge the reaction by-products and unreacted fuel. Preferably, the exhausting means also establishes the low pressure conditions required for proper system operation.

In a specific embodiment, the means for supplying or generating the high pressure conductive plasma is a high velocity plasma jet that converts neutral fuel into a conductive plasma and propels it towards the nozzle region of the extrusion dynamo. Preferably, the jet also establishes a stagnation pressure zone that drives the plasma extrusion dynamo and forms the toroidal plasma structure and associated current loop. The fusion reactor also includes means for collecting the energy produced by the fusion reactions and converting the excess energy into available power (e.g., electricity) for use.

In a second embodiment, a fusion reactor according to the instant invention includes two plasma extrusion dynamos. The two dynamos are in a nozzle-to-nozzle relationship along a common axis with shared magnetic field lines so as to form an enclosed plasma pressure chamber between the nozzles. Neutral fuel is injected into the enclosed plasma chamber and it is ionized and heated to form the relatively high temperature low pressure plasma. The ionization and heating energy may be supplied by external means such as microwaves or neutral beams. Preferably, the fuel is ionized and heated by radiant energy from fusion reactions taking place in the two nozzle throats. The plasma then expands through each nozzle and drives the plasma extrusion dynamos, forming two toroidal plasma structures.

In a specific embodiment, a separating coil is positioned on the plane of symmetry between the nozzles. Additionally, the separating coil is energized with a current that prevents the coalescence or merger of the two toroidal plasma structures in the nozzle regions of the plasma extrusion dynamos. The separator coil also preferably clamps the current loops of the respective plasma extrusion dynamos to reduce the tendency of the loops to rotate about an axis perpendicular to the dynamos' common axis.

BRIEF DESCRIPTION OF THE DRAWINGS

For a fuller understanding of the nature and desired objects of the present invention, reference is made to the following detailed description taken in conjunction with the accompanying drawing figures wherein like reference character acter denote corresponding parts throughout the several views and wherein.

DESCRIPTION OF THE PREFERRED EMBODIMENT

Figure 1:
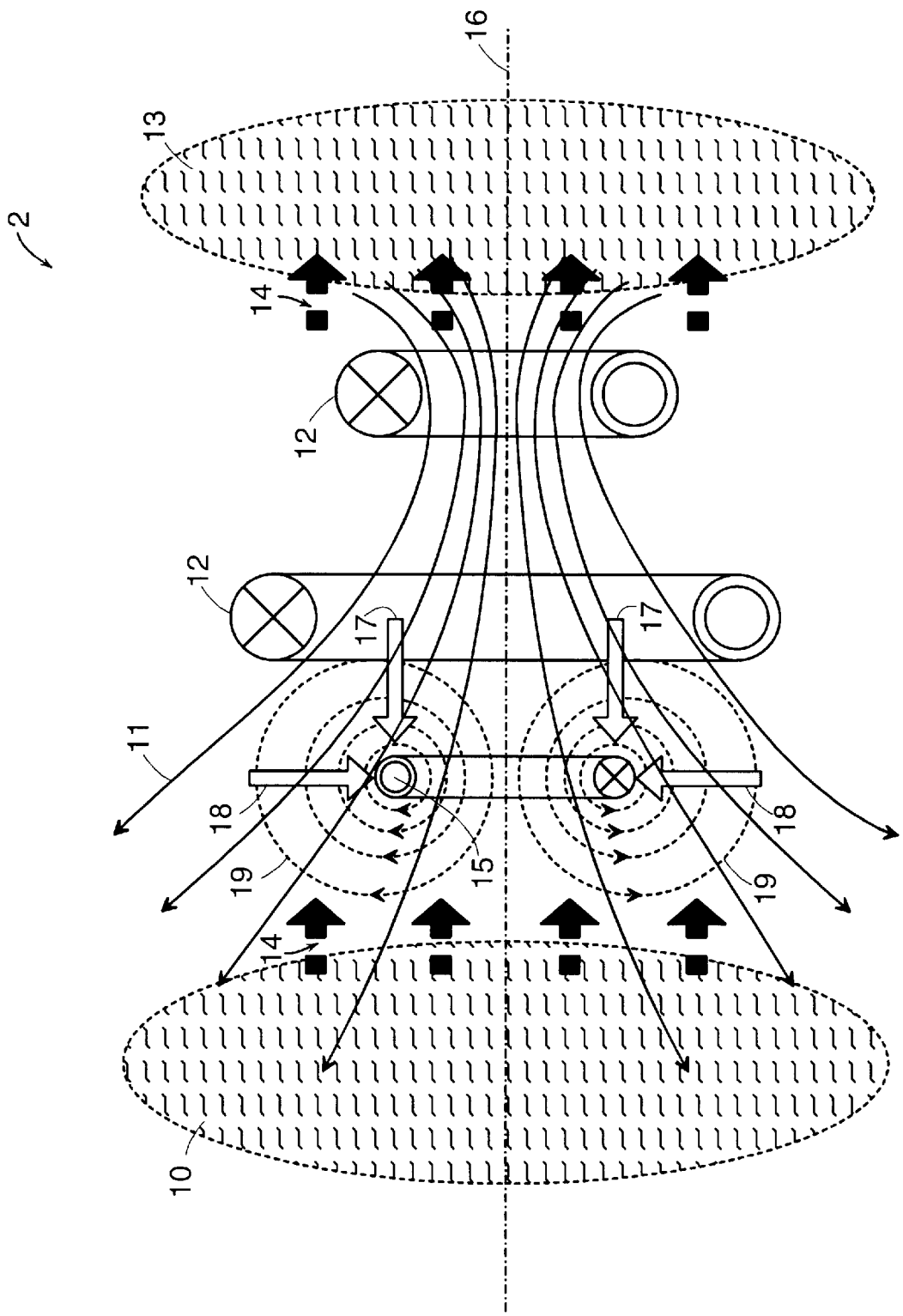
FIG. 1 is a schematic cross-sectional side view of a plasma extrusion dynamo of the present invention showing the applied and current loop fields separately.

Referring now to the various figures of the drawing wherein like reference characters refer to like parts, there is shown in FIG. 1 a schematic cross-sectional side view of a plasma extrusion dynamo 2 of the present invention showing the applied and current loop fields separately. In the present invention, the continuous extrusion of plasma through a converging magnetic nozzle forms a stationary, steady-state current loop 15 within the moving plasma stream 14 as hereinafter described.

In an exemplary embodiment, the plasma extrusion dynamo 2 of the present invention includes a plurality of nozzle coils 12 that are configured to produce the converging field lines 11. While two coils are illustrated, this is not a limitation. It is with the skill of those knowledgeable in the art to adjust the strength, size and number (i.e., at least one) of the coils to provide the desired magnetic field so as to create the desired annular current flow path 15 in the moving plasma flow 14. For example, the nozzle coils can be arranged alone or in combination with ferromagnetic structures to produce the converging magnetic fields. Also, the nozzle coils can be arranged to generate funnel like converging magnetic fields that present any of a number of cross sections, including circular, elliptical, oval and polygonal cross sections, that will produce a closed current loop 15 responsive to the flowing conductive plasma. Preferably, the magnetic field being generated by the nozzle coils 12 is a converging conical magnetic field so as to form a nozzle or inlet region that receives the plasma flow 14.

In the illustrated embodiment, the nozzle coils 12 are direct current electromagnetic coils. Alternatively, the nozzle coils can be superconducting coils or permanent magnets. Further, ferromagnetic structures such as iron, disposed outside the plasma, can be used to concentrate or guide the magnetic fields being generated by the nozzle coils 12 to produce a magnetic field have the desired cross section and strength.

As described in specific fusion reactor embodiments below (see FIGS. 3–4), a neutral fuel 32 is converted into a conductive plasma using any one of a number of techniques known in the art, as well as using the heat and radiation from continuous fusion reactions. The conductive plasma being presented to the converging magnetic field is a pressurized conductive plasma flow so as to form a high pressure region 10 upstream of the nozzle region. The conductive plasma flows towards the converging field lines 11 formed by the set of direct current carrying nozzle coils 12 to a lower pressure exhaust region 13.

The nozzle or inlet region is formed by the converging magnetic field lines 11 such as those near the center of a circular current loop 15. The plasma flow 14 intersects the converging field lines 11 and crosses the radial components of the field. The crossing of the magnetic field lines 11 by a conductive fluid such as the plasma flow 14 is resisted if the field and plasma geometry is such that a sustained current is free to flow in the fluid in a direction perpendicular to the plane defined by the magnetic field lines and the plasma pressure gradient. More particularly, the crossing of the field lines by the plasma flow 14 generates a circularly polarized voltage and current loop 15 surrounding or about the axis 16 of the nozzle and plasma extrusion dynamo 2.

Because the plasma current loop 15 interacts with the radial nozzle field components to retard the flow, a pressure gradient between the upstream and downstream side of the nozzle is required to maintain the flow of plasma. The current loop 15 in the plasma also interacts with the axial components of the magnetic field lines 11 in the nozzle region to generate radially inward forces 18 that tend to squeeze the plasma current loop to a smaller diameter. The squeezing forces 18 are resisted by plasma pressure as well as by the mutual magnetic repulsion of the opposite sides of the plasma current loop 15. The resistive plasma continues to flow and cross the nozzle field lines. The new plasma entering behind it interacts in turn with the magnetic field in the nozzle region and renews the plasma current loop.

The result is a steady plasma extrusion flow through the nozzle that generates a steady-state, stationary current loop 15 for an indefinite period of time. The flow energy sustains the current against resistive losses. At higher plasma temperatures the lower plasma resistivity reduces the losses and consequently reduces the required flow rate.

In sum, the conditions are such that the plasma flow is retarded by the field lines 11 and a current loop 15 is formed in the nozzle region of the magnetic field. The current loop 15 interaction with the radial components of the field lines 11 produces axial retarding forces 17, and the interaction with the axial field lines produces radial squeeze forces 18. The retarding forces 17 and the radial squeeze forces 18 act to retard the plasma flow 14 and compress the plasma to a smaller diameter. This occurs because the plasma particles are the charge carriers that form the current and experience the electromagnetic field forces.

The current loop 15 generates a poloidal magnetic field 19, i.e., a set of closed poloidal magnetic flux loops, that extends along the circumferential length of the current loop 15. This poloidal magnetic field 19 has three effects. First, it encloses a toroidal plasma volume with closed field lines 20 (FIG. 2) which tend to contain the plasma particles. Second, the plasma current loop charge carriers interact with the poloidal field and are compressed toward the center of the current path cross-section through a pinch effect. This pinched center forms the fusion reaction zone. Third, the current loop interacts with itself through the poloidal field to expand the loop and resist the radial squeeze forces 18. The pinched plasma also is contained so it is far from any physical walls so as to sustain nuclear fusion reaction conditions.

Under steady-state conditions the current loop 15 will reach an equilibrium size and current level that depends on the applied pressure gradient for the plasma flow and the strength and geometry of the magnetic nozzle field 11. Plasma particles, acting as current charge carriers, will loose momentum in the current carrying direction through collisions (the normal electrical resistance effect), and flow toward the exhaust under the influence of the pressure gradient. The motion across the field lines 11 will cause the plasma particles to again become current loop charge carriers, but in a path closer to the exhaust. The net result of this process is a pressure driven flow through the magnetic nozzle which maintains a steady-state current flow through dynamo action which balances resistive losses. It should be noted that while there is a plasma flow through the magnetic nozzle under steady-state conditions, the current loop is stationary with respect to the nozzle coils 12 and the axis 16. This flow-through effect provides an automatic means of adding fresh fuel to the reaction zone and removing reaction products.

Second order interactions such as flux relaxation may convert some of the poloidal flux 19 to toroidal flux parallel to the current loop 15. This will result in a more stable flux configuration. The form of the plasma toroid depends on the design of the magnetic nozzle. If radial field lines dominate, a relatively force-free toroid resembling a spheromak will result. If axial flux lines dominate, a tightly squeezed structure will be formed which resembles a theta pinch toroid.

Figure 2:
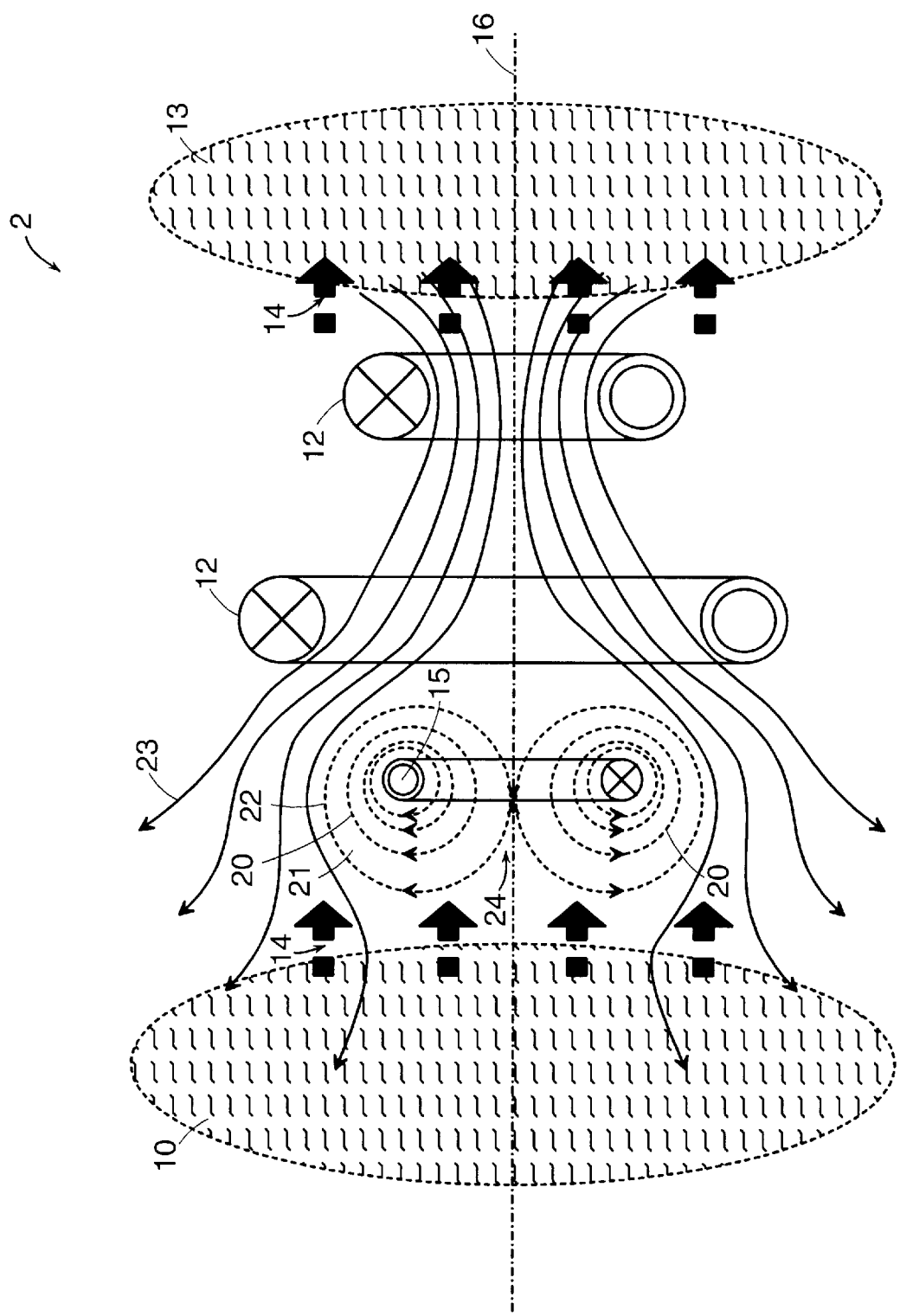
FIG. 2 is a schematic cross-sectional side view of a plasma extrusion dynamo of the present invention showing the resultant of the applied and current loop fields.

Referring now to FIG. 2, there is shown a schematic cross-sectional side view of the plasma extrusion dynamo 2 of FIG. 1 showing the resultant of the nozzle field 11 and the current loop poloidal field 19. As shown, the closed field lines 20 of the poloidal field 19 encloses the current loop 15 and forms a toroidal volume 21. As indicated above, the interaction of the plasma current loop 15 with its own poloidal magnetic field 19 compresses the plasma in the toroidal volume 21 toward the toroid section axis through the pinch effect.

The closed field lines 20 forming the toroidal volume 21 retard the plasma in the high pressure region 10 from flowing directly to the lower pressure exhaust region 13. As such, the toroidal volume 21 acts in effect acts as a flow retarding device. The closed field lines 20 also present a converging field region 24 to the high pressure region 10 which is similar to converging field generated by the nozzle coils 12, but which is smaller and of opposite polarity. The converging region 24 tends to retard flow through the center of the toroidal volume 21 thereby enhancing the flow retarding performance of the toroidal volume 21.

The border between the closed poloidal field lines 20 of the current loop 15 and the surrounding open field lines 23 generated by the nozzle coils 12, is typically referred to as the separatrix 22. The relative position of the separatrix 22 with respect to the axis 16 is a function of both the velocity of the plasma flow 14 and the strength of the nozzle coil generated magnetic field. For example, the diameter of the current loop 15 can be increased by increasing the velocity of the plasma flow 14 and, correspondingly, the diameter can be decreased by increasing the strength of the nozzle coil generated magnetic field.

Figure 3:
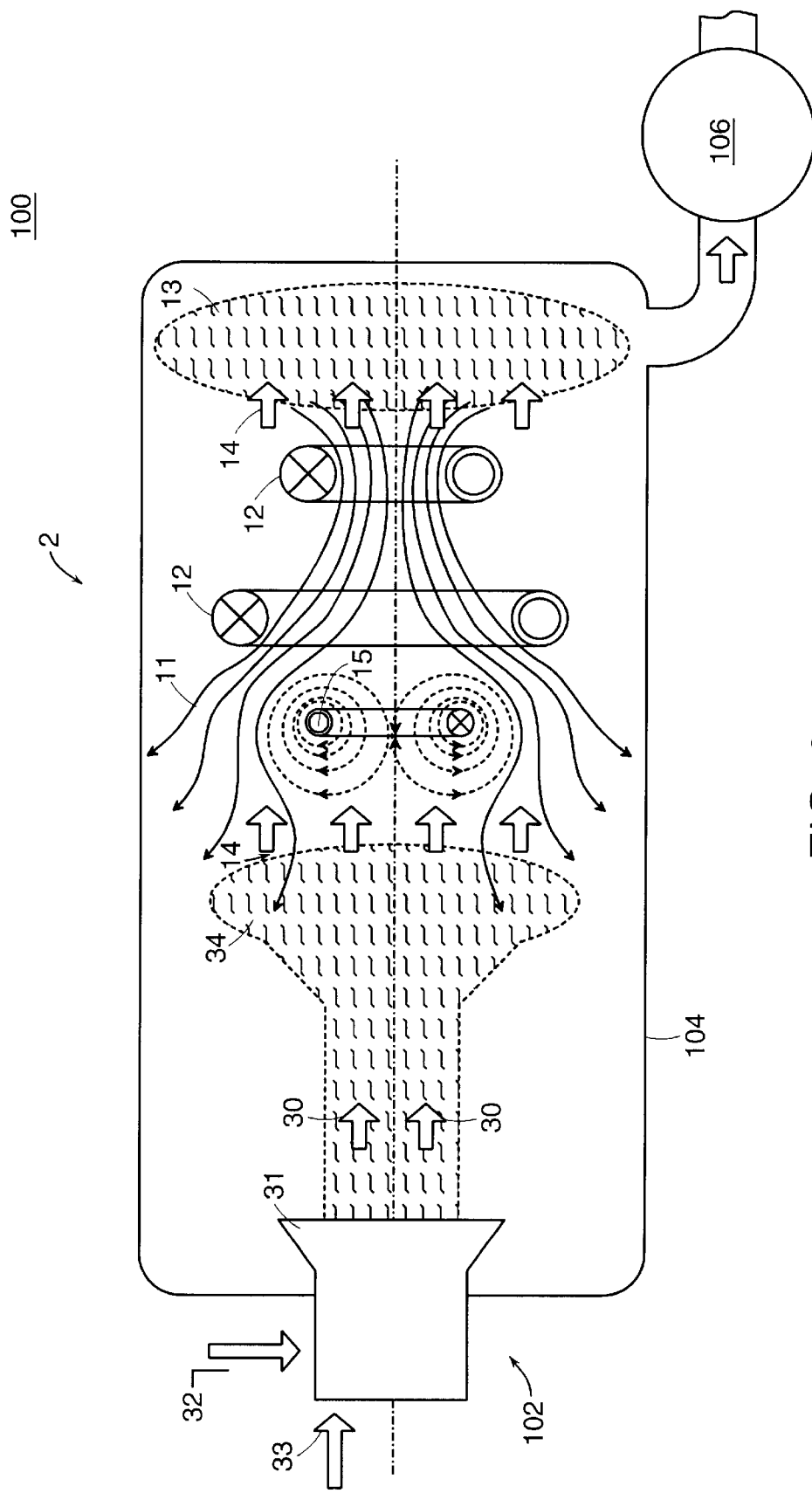
FIG. 3 is a schematic cross-sectional side view of one fusion reactor embodiment with a plasma extrusion dynamo of the present invention.

Now referring to FIG. 3, there is shown a schematic cross-sectional side view of one embodiment of a fusion reactor 100 with a plasma extrusion dynamo 2 of the present invention. The fusion reactor 100 includes a plasma extrusion dynamo 2 of the present invention, a means 102 for providing the pressurized plasma, an housing 104 and a vacuum pump 106. In terms of a fusion reactor, the conductive plasma is deuterium, tritium or any other element known in the art, or any combination of elements thereof, that can release energy as a result of a nuclear fusion reaction. The reactor also includes means (not shown) for capturing the energy generated by the fusion reactions so useable energy (e.g., electricity) can be provided to consumers. Reference also should be made to the foregoing for any item not specifically described hereinafter.

The means 102 for providing the pressurized plasma 102 includes a plasma jet 31 that forms and accelerates the high velocity plasma 30 towards the nozzle region of the converging magnetic field lines 11 set up by the nozzle coils 12. The plasma jet 31 using known principles or techniques, e.g., arc discharge, converts neutral fuel 32 (e.g., deuterium) into a high velocity plasma stream using electric power 33 as an energy source.

The plasma jet 31, the nozzle coils 12, the stagnation pressure zone 34, and the exhaust region 13 are enclosed in an impermeable vessel or housing 104. A vacuum pump 106 and associated exhaust piping is fluidically interconnected to the interior of this impermeable vessel or housing 104 so as to remove the exhaust gas and fusion reaction by-products as well as maintaining the low pressure conditions required for reactor operation. The impermeable vessel or housing may be manufactured from any of a number for materials, or combination of materials, as is known in the art that are adequate for the intended use and environmental conditions, e.g., a gas impermeable metallic shell with a ceramic or graphite lining.

The vacuum pump 106 may be any of a number of known vacuum pumps or vacuum pumping systems that can maintain the required low pressure conditions within the housing 104 and capable of removing fusion reaction by-products and/or exhaust gases. For example, a system including a mechanical type of vacuum pump and a diffusion type of vacuum pump can be used to evacuate the housing interior and maintain a continuing exhaust process.

The high velocity plasma jet 30 interacts with the converging nozzle field lines 11 and is decelerated, forming a high pressure stagnation region 34 upstream of the nozzle.

The high pressure of the stagnation pressure zone 34 causes plasma to flow towards the lower pressure exhaust region 13. This flow of plasma, as previously described above, as it crosses the magnetic field lines 11 generates a current loop 15 for fusion reaction containment. The stagnation zone 34 and the continuous replenishment of conductive plasma from the high velocity plasma jet 30 assures a constant source of flowing plasma to maintain the current loop 15 as well as to create the conditions conducive to fusion reactions.

Figure 4:
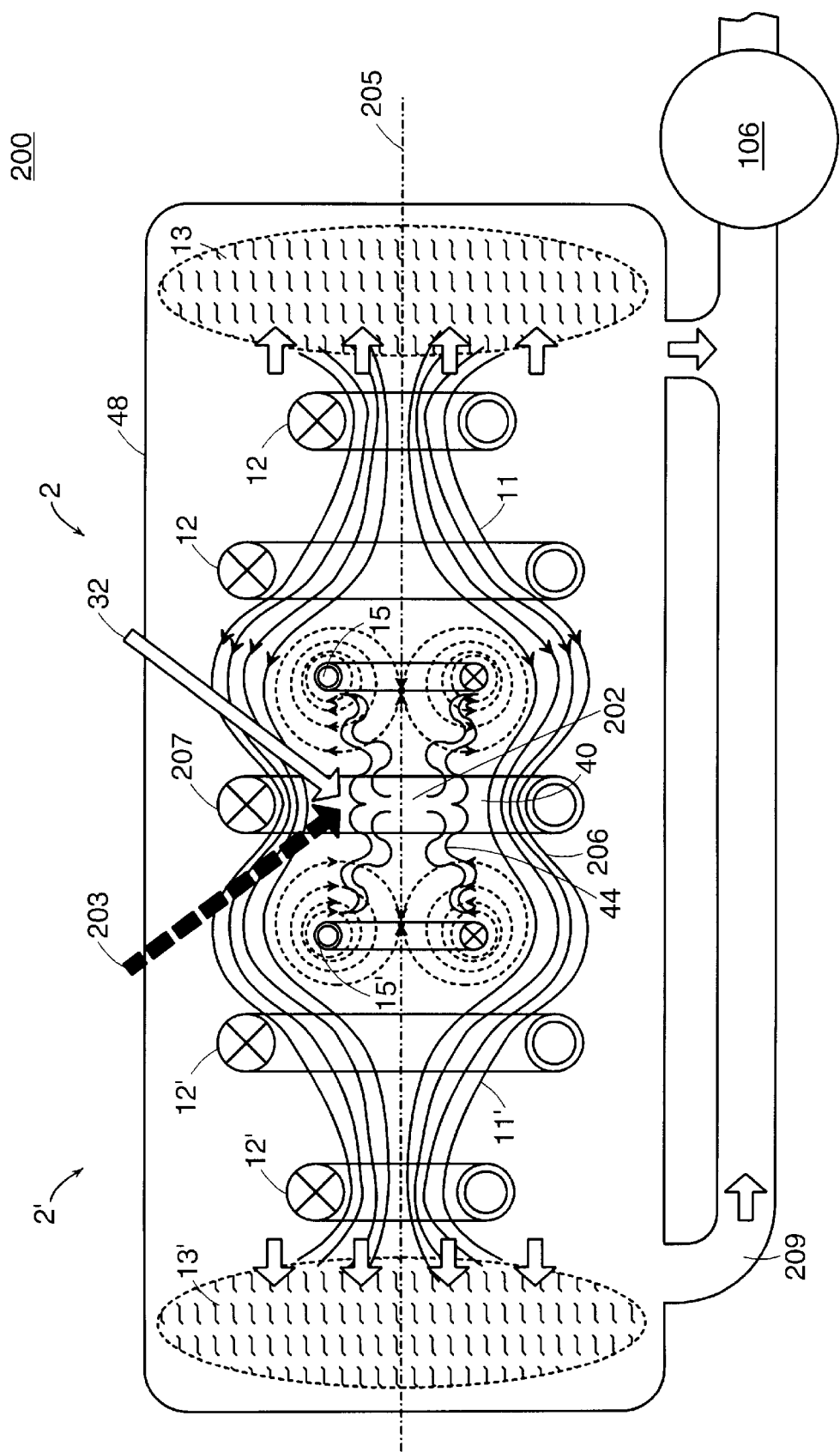
FIG. 4 is a schematic cross-sectional side view of another fusion reactor embodiment with two plasma extrusion dynamos.

Now referring to FIG. 4, there is shown a schematic cross-sectional side view of another embodiment of a fusion reactor 200 that is configured with two plasma extrusion dynamos 2,2' of the present invention having a common supply chamber 202. Reference should also be made to the foregoing for any item or feature not specifically described hereinafter. Also, in the following certain reference numerals have been provided with and without a "'" (e.g., 2 and 2') to distinguish the corresponding components of, and the two plasma extrusion dynamos 2,2'. Unless otherwise indicated in the following, the above described characteristics and features apply equally to the corresponding components and/or the dynamos.

In operation, neutral fuel 32 is injected into the central volume of the common supply chamber 202, wherein it is converted to a relatively high pressure, relatively low temperature plasma 40. Microwaves 203, neutral beams or other known means of heating neutral material to form plasma can be supplied from an outside source to start or sustain the process. Preferably, the radiation 44 from fusion reactions supplies most or all of the plasma formation energy in steady-state operation.

Each pair of direct current carrying nozzle coils 12,12' of the respective plasma extrusion dynamos 2,2' are placed back-to-back on a common axis 205. Both nozzle coils 12,12' are energized with a current in the same rotational direction so the converging nozzle fields 11,11' join and surround the central volume of the common supply chamber 202 with a common field 206. A separator coil 207 is placed midway between the nozzle coils, and centered on their common axis 205. The separator coil 207 is energized with a current in the same rotational direction as is used to energize the nozzle coils 12,12'. The separator coil 207 contributes to the common field 206 and has other functions that are described below.

As with the first fusion reactor embodiment described above, the fusion reactor 200 also includes a housing 104 and a vacuum pump 106. The impermeable vessel or housing 104 surrounds both of the extrusion dynamos 2,2' including both sets of nozzle coils 12,12', the common supply chamber 202, and separator coil 207. The vacuum pump 106 and the associated exhaust piping 209 or ducts are fluidically interconnected to the interior of the impermeable vessel or housing 104 so as to remove the exhaust gas and fusion reaction byproducts as well as to maintain the low pressure conditions required for reactor operation.

The plasma 40 in the common supply chamber 202 is at relatively high pressure, and flows to the lower pressure exhaust regions 13,13' defined for the respective extrusion dynamos. As described in the foregoing, the plasma flow crosses the field lines 11,11' and generates current loops 15,15' for fusion reaction containment in each of the plasma extrusion dynamos.

Because the plasma current loops 15,15' have parallel currents, the magnetic fields of each will have a tendency to attract each other creating the potential for merging the two current loops. Such a merger would disrupt the dynamo process in at least one of the two magnetic nozzles. The separator coil 207, preferably carries current anti-parallel to that in the plasma current loops 15,15' to repel the current loops thereby preventing merger. The separator coil 207 also clamps the plasma current loops 15,15' between anti-parallel coils to reduce their tendency to rotate about an axis perpendicular to the axis 205 common to the extrusion dynamos 2,2'.

Although a preferred embodiment of the invention has been described using specific terms, such description is for illustrative purposes only, and it is to be understood that changes and variations may be made without departing from the spirit or scope of the following claims.

What is claimed is:

1. A method for forming a closed current loop in a conductive fluid comprising the steps of:

establishing a converging magnetic field; and flowing the conductive fluid through the converging magnetic field in the direction of contraction.

2. The method for forming a closed current loop of claim 1, wherein the conductive fluid is a conductive plasma suitable for nuclear fusion reactions.

3. The method for forming a closed current loop of claim 1, wherein said step of flowing includes establishing a high to low pressure gradient in the direction of flow.

4. The method for forming a closed current loop of claim 1, wherein said step of flowing includes flowing the conductive fluid in the direction of contraction so the flowing conductive fluid crosses radial components of the field lines of the converging magnetic field being established.

5. The method for forming a closed current loop of claim 4, further comprising the step of establishing poloidal magnetic fields about the formed current loop.

6. The method for forming a closed current loop of claim 1, wherein the converging magnetic field being established has a cross sectional configuration in the direction of flow of one of circular, oval, elliptical and polygonal.

7. The method for forming a closed current loop of claim 1, wherein the converging magnetic field being established has a circular cross section in the direction of flow and wherein the current loop being formed is an annular ring of current.

8. The method for forming a closed current loop of claim 5, wherein the conductive fluid is a conductive plasma suitable for nuclear fusion reactions and wherein said method further comprises the step of selecting a magnitude for the converging magnetic field being established and a flow for the flowing plasma so as to create conditions within the poloidal magnetic field conducive to fusion reactions.

9. The method for forming a closed current loop of claim 8, further comprising the steps of exhausting fusion reaction by-products and unreacted plasma from within the poloidal magnetic fields and replacing therewith fresh unreacted plasma so as to continuously maintain the conditions conducive for fusion reactions.

10. The method for forming a closed current loop of claim 1, further comprising the step of interacting the flowing conductive fluid and field lines of the converging magnetic field.

11. A method for forming two closed current loops in a conductive fluid comprising the steps of:

establishing two converging magnetic fields; and flowing the conductive fluid through each of the converging magnetic fields in the direction of contraction for each.

12. The method for forming two closed current loops of claim 11, wherein said step of flowing includes establishing a high to low pressure gradient in the direction of flow for each converging magnetic field.

13. The method for forming two closed current loops of claim 11, wherein each converging magnetic field includes an inlet region and wherein said method further comprises the step of arranging the two converging magnetic fields so the inlet regions are in back to back relationship and so a long axis of each converging magnetic field is in common.

14. The method for forming two closed current loops of claim 13, further comprising the step of establishing poloidal magnetic fields about each of the formed current loops.

15. The method for forming two closed current loops of claim 14, wherein the conductive fluid is a conductive plasmas suitable for nuclear fusion reactions and wherein said method further comprises the step of selecting a magnetic field magnitude for each of the converging magnetic fields and a flow for the flowing plasma through each converging magnetic field so as to create conditions within each poloidal magnetic field conducive to fusion reactions.

16. The method for forming two closed current loops of claim 15, further comprising the steps of exhausting fusion reaction by-products and unreacted plasma from within each poloidal magnetic field and replacing therewith fresh unreacted plasma so as to continuously maintain the conditions conducive for fusion reactions in each poloidal magnetic field.

17. The method for forming two closed current loops of claim 11, further comprising the step of interacting the flowing conductive fluid flowing through each converging magnetic field and field lines therefor.

* * * * *